United States Patent
Konovalov et al.

(10) Patent No.: US 7,087,547 B2
(45) Date of Patent: Aug. 8, 2006

(54) ALKALI-FREE DEMERCAPTANIZATION CATALYST FOR HYDROCARBON COMPOSITIONS

(75) Inventors: Alexei Konovalov, Lamaca (CY); Vladimir Smirnov, Moscow (RU); Vladimir Konovalov, Lubertsy (RU); Irina Tarkhanova, Moscow (RU)

(73) Assignee: Framson LTD, London (GB)

( * ) Notice: Subject to any disclaimer, the term of this patent is extended or adjusted under 35 U.S.C. 154(b) by 407 days.

(21) Appl. No.: 10/451,259

(22) PCT Filed: Mar. 29, 2001

(86) PCT No.: PCT/CY01/00001

§ 371 (c)(1),
(2), (4) Date: Jun. 20, 2003

(87) PCT Pub. No.: WO02/079373

PCT Pub. Date: Oct. 10, 2002

(65) Prior Publication Data

US 2004/0026297 A1    Feb. 12, 2004

(51) Int. Cl.
*B01J 31/02* (2006.01)
*B01J 31/22* (2006.01)
*C08F 4/42* (2006.01)

(52) U.S. Cl. .................. 502/123; 502/62; 502/104; 502/114; 502/118

(58) Field of Classification Search .................. 502/62, 502/104, 114, 118, 123
See application file for complete search history.

(56) References Cited

U.S. PATENT DOCUMENTS 4,159,964 A    7/1979    Frame

FOREIGN PATENT DOCUMENTS

| | | |
|---|---|---|
| EP | 0245893 | 11/1987 |
| EP | 0252853 | 1/1988 |
| FR | 2573087 | 5/1986 |
| FR | 2591610 | 6/1987 |

*Primary Examiner*—Tam M. Nguyen
(74) *Attorney, Agent, or Firm*—I. Zborovsky

(57) ABSTRACT

A catalyst for oxidative demercaptanization of hydrocarbon compositions, comprising 0.2–5% of an oxide selected from the group consisting of an oxide of a transition metal of group Ib, an oxide of a transition metal of group Vb, an oxide of a transition metal of group VIb, an oxide of a transition metal of group VIIb, a nickel oxide, a cobalt oxide, and a mixture of at least two of said oxides; 0.5–20% of a transition metal salt; 0.5–20% of a nitrogen-containing organic compound; and an inert component, the rest up to 100%; wherein, the above described catalyst is used for demercaptanization or sweetening of hydrocarbon compositions.

4 Claims, No Drawings

ALKALI-FREE DEMERCAPTANIZATION CATALYST FOR HYDROCARBON COMPOSITIONS

BACKGROUND OF THE INVENTION

1. Field of the Invention

The invention relates to catalytic systems, consisting of an active part and inert component and intended for the oxidative demercaptanization (sweetening) of hydrocarbon compositions including petroleum, petroleum distillates, gasolines, kerosenes, jet fuels, diesel fuels and heating oils, natural-gas liquids, etc., processes for the production of the catalysts, and their use in the field mentioned above.

2. Description of the Prior Art

The oxidative demercaptanization (sweetening) of hydrocarbon compositions (e.g. petroleum distillates, fuels etc.) is well known and widely practiced process for removal of poor smelling, toxic and corrosive mercaptans and related substances. Said process is based on the oxidation of mercaptans with the formation of innocuous disulphides. Processes where the hydrocarbons have been treated by oxygen or oxygen-containing gas in the presence of homogeneous or heterogeneous metal-complex catalysts and alkaline agent (more often aqueous caustic), e.g., well known UOP MEROX process, have obtained the greatest distribution.

Catalyst for the oxidative demercaptanization should satisfy to the following main requests:

provide decrease of mercaptan sulphur concentration in the treated products to an tolerance level (usually 3–10 ppm);
stable work during long time;
not pollute a product by harmful impurities;
not contain expensive and poison components;
hydrocarbon compositions mustn't change their colour or become less stable after the treatment.

Besides, it is desirable that the catalyst could be easily regenerated.

A commonly used catalyst for alkaline sweetening is cobalt phthalocyanine (see for example European patent-394571, German patent 3008284 etc.). Use of alkalies complicates the technology because of an occurrence of additional operations on the separation of water and organic phases and the clearing of waste water. Attempts to create effective non-alkaline process therefore do not cease.

A rather large number of catalysts and catalytic compositions for non-alkaline demercaptanization is known on the basis of connections of transitive metals. It was offered to use:

chelate complexes including porphyrinates of transition metals (Co, Cu, V a.o., European patent 0252853);
complexes of transition metals (e.g. Co, Cu, Ni, Fe) with three- or tetradentate ligands containing at least one amide group (French patent 2573087);
phthalocyanines of transition metals (U.S. Pat. No. 4,159,964),
complexes of transition metals with cation-exchange resins (British patent 1167017);
products of reactions between transition metal salts and tetracyanothiophene or tetracyanodithiine (French patent 2591610);
cupric salts, e.g. cupric chloride, in a combination with organic acids, alkyl amines, alkanol amines, amino acids, or urea derivatives (British patent 996500).

Various oxides are often applied as inert components (supports) for heterogeneous catalysts. For example, silica, alumina, alumosilicates, zeolites are listed in French patent 2591610. The use of Si, Al, Zr, Th oxides and products of their combination with oxides of silicon and other elements, for example, kaolin, montmorillonite, etc., were pointed out in European patent 0252853. An active carbon, frequently with various additives, is another widespread carrier. So, active carbon, modified by phosphates, e.g., ammonium phosphates, is offered in British patent 996500 as an inert component.

There is no mention in the prior art that combinations of transition metal oxides and complexes of transition metal salts with organic compounds would be effective catalytic systems for the oxidative demercaptanisation. Quite surprisingly we have found that such combinations of nitrogen-containing organic compounds gave excellent results. Thus, the present invention provides a new catalytic composition, the method of its production and its use in the oxidative demercaptanization.

SUMMARY OF THE INVENTION

An object of this invention is to provide a new catalyst consisting of an active part and inert component and intended for the oxidative demercaptanisation (sweetening) of hydrocarbon compositions including petroleum, petroleum distillates, gasolines, kerosenes, jet fuels, diesel fuels and heating oils, natural-gas, liquids etc. The active part contains a transition metal of Groups Ib, V–VIIb of the Periodic Table, either Ni, or Co, or mixture of oxides of the indicated elements, and transition metal salts, and nitrogen-containing organic compounds. The inert component is an oxide of an element of Groups IIa, III, IV, or Fe oxide, or a chemical compound including not less than 95% oxides of indicated elements, or mixture of the above compounds.

Other objects of this invention are provide a method for preparing the above mentioned systems and their use in the oxidative demercaptanization.

DETAILED DESCRIPTION OF THE INVENTION

The offered catalyst contains 0.2–5% oxides of a transition metal of Group Ib, Vb, VIb, VIIb of the Periodic Table, either Ni, Co oxide, or mixture of oxides of (above) the said metals. As an example, cupric oxide can be used as an element of Group Ib oxide, oxides of Nb(V), V(V) Mo(VI), Cr(III))—as oxides of elements of Groups Vb–VIIb.

The catalytic system contains also 0.5–20% of transition metal salt. Co, Cu, Ni, Mn and others can be selected as transition metals. Chlorides, bromides, carboxilates and others can be used as anions in the salts.

The catalytic system contains 0.5–20% of nitrogen-containing organic compound. It may be:

a) amine, e.g., triethyl amine, tributyl amine, ethylene diamine, triethylene tetramine, pyridine;
b) amino acid, e.g. threonine, asparagine, hydroxyproline, betaine, cysteine, serine;
c) amide, e.g. formamide, dimethyl formamide, dimethyl acetamide;
d) alkanol amine, e.g. mono- di, triethanolamine or their hydroxides;
e) urea derivatives, e.g. urea and their alkyl derivatives, and combination of two or more substances from this set.

The last-named component of the catalytic system, completing its composition up to 100%, is the inert component. The inert component can be an oxide of an element of Groups IIa, III or IV or Fe oxide. An oxide of an element of Groups IIa, III–IV can be, in particular, Si, Al, Mg, Zr, Ti, or La oxide. The inert component can be also a chemical compound (in particular, silicate or zeolite), containing not less, than 95% of indicated oxides, or mixture of the above compounds.

The method for the catalyst production includes a formation of high-dispersed metal oxide on a surface of the inert component by its impregnation with the metal salts from aqueous solutions, and its thermal decomposition at high temperatures in airflow. Transition metals' nitrates, sulfates, acetates, e.g., can be used at this stage. Then the product is impregnated with a solution of a transition metal salt and nitrogen-containing organics dissolved in organic solvent. Chlorides, bromides, or carboxylates can be used at this stage. The catalyst obtained was dried up on air at ambient temperature and warmed up in airflow.

The application of the catalyst in demercaptanization process assumes passing of hydrocarbon compositions containing mercaptanes, among them petroleum, petroleum distillates, gasolines, kerosenes, jet fuels, diesel fuels and heating oils, natural-gas liquids etc., through a fixed or fluidizad bed of the catalyst at 10–80° C. in the presence of air or another oxygen-containing gas. Oxygen-containing gas is oxygen or gas with not less than 5% of oxygen. The process is carried out at normal or hightened (up to 10 at.) pressure.

EXAMPLE

A. Preparation of the Catalysts $SiO_2$ (macroporous silica gel with a specific surface area 250 m$^2$/g) was calcined on air within 2 hours at 450° C. Then it was treated with concentrated aqueous solution of cupric nitrate in an amount correspondent to 0.3 g CuO per 100 g of the support. The paste formed was maintained within one hour at ambient temperature on air and was calcined by hot airflow (1 hour at 100° C. and 2 hours at 550° C.). Then it was cooled up to room temperature and vacuumed. Afterwards 30% solution of DMF in acetonitrile in an amount correspondent to 14 ml DMF per 100 g of silica and 1.5% solution of $CuCl_2$ (5 g $CuCl_2$ per 100 g silica) were added under vacuum. The mixture was heated at 50° C. within 2 hours, then a solid residue was separated and treated by airflow at ambient temperature. The contents of $CuCl_2$ and DMF in the catalyst were calculated as a difference between the former amount of a reagent and its content in the solution after the separation of the catalyst. The received catalyst A contains 0.3% CuO, 5% DMF, and 3.5% $CuCl_2$.

The following catalysts were obtained by the same way:

B—CuO—1.2%, CoO—1.5%, pyridine—9%, DMF—5%, $CuBr_2$—6%, the rest is $Al_2O_3$;

C—CuO—2.5%, monoethanol amine—14%, $CuCl_2$—2.5%, the rest is a mixture of $SiO_2$ and $Al_2O_3$ (1:1 by weight);

D—CuO—0.2%, monoethanol amine—4%, $CuCl_2$—3%, the rest is alumosilicate ($Al_2O_3$—44%, $SiO_2$—54.5%, $La_2O_3$—1.5%);

E—CuO—0.4%, hydroxiproline—2.2%, $CuCl_2$—0.8%, the rest is alumosilicate ($Al_2O_3$—41%, $SiO_2$—53%, $Na_2O$—0.2%, MgO —1.2%, $Fe_2O_3$—1.6%, $TiO_2$—3%)

The similar catalyst F, not containing previously added transition metal oxide, was prepared for comparative tests: DMF—5%, $CuCl_2$—5%, the rest is $SiO_2$.

B. Sweettening Tests

In standart tests we used kerosene (interval of b.p. 160–2400 C) with following parameters:

The total content of sulphur 0.19%,

The content of mercaptane sulphur—0.009–0.011%,

The acidity in mg of KOH per 100 mL of kerosene—0.63,

The content of resins in mg per 100 mL kerosene—2.5.

Kerosene with air dissolved was passed with relevant speed through a column filled with 20 g of a catalyst at the ambient temperature and normal pressure. An additional saturation of the catalyst or kerosene by oxygen was not performed. The result was considered as satisfactory, if on an output of the reactor the content of mercaptane sulphur in kerosene did not exceed 3 ppm. Copper was not detected on the output of the reactor by analytical methods with sensitivity on the metal about 0.5 ppm. An average acidity on the output was 0.22 mg KOH per 100 mL of kerosene. The content of resins and total content of sulphur after sweetening did not change. The colour of kerosene did not change. The storage of the sweetened product in metal capacities for a month did not result in change of the colour and any other deviation.

The results of the tests, representing the activity of various catalysts, are submitted in tab. 1. The activity was characterised as maximum space velocity of kerosene feeding when sweetening remained satisfactory.

TABLE 1

| Catalyst | T, ° C. | Sp. velocity, hrs$^{-1}$ |
|---|---|---|
| A | 25 | 25 |
| B | 25 | 35 |
| C | 25 | 40 |
| D | 25 | 60 |
| E | 25 | 55 |
| F | 25 | 15 |
| E | 40 | 60 |
| E | 63 | 60 |
| E | 80 | 48 |

It is clear from the table, that all the catalysts have high activity. Not containing metal oxide catalytic composition F gives the worse results.

The possibility of the process realization in flow-bed reactor was checked up at the catalyst D as an example. The required degree of sweetening was achieved at space speed of kerosene feeding about 60–65 hrs$^{-1}$. Thus, the results were not worse than for a fixed bed catalyst. The preliminary saturation of kerosene by oxygen allowed increasing the speed of the starting material feed up to 80 hrs$^{-1}$. Gas, containing 10% $O_2$ and 90% $N_2$ (a mixture of nitrogen and air) instead of oxygen, gave at the pressure 2 Barr the same result as that received at the presence of air at the normal pressure.

The duration of the incessant work of a catalyst with the volume speed of kerosene about 40 hrs$^{-1}$ was determined for the catalyst E as an example. Kerosene volume sweetened on the given catalyst until regeneration becomes necessary was measured. The regeneration of the catalyst was performed by air treatment at 500° C. for 2 hours, impregnation by solution of $CuCl_2$ and monoetanolamine in acetonitrile for 1.5 hours, and subsequent calcination at 100° C. The data demonstrating the stability of the catalytic activity before and after regeneration ar given in tab. 2.

TABLE 2

| Catalyst | T, ° C. | Kerosene sweetened, L/Catalyst, dm$^3$ |
|---|---|---|
| E | 25 | 6200 |
| E | 40 | 6700 |
| E | 63 | 6000 |
| E | 80 | 5500 |

TABLE 2-continued

| Catalyst | T, ° C. | Kerosene sweetened, L/Catalyst, dm³ |
|---|---|---|
| E | 25* | 6800 |
| F | 25 | 750 |

*the space velocity of kerosene 25 hrs⁻¹.

It is seen from tab. 2, that catalysts prepared according to the invention are very stable. Catalyst F, not containing transition metal oxide, on the contrary, fails to maintain the necessary efficiency of sweetening already after 750 volumes of kerosene per 1 volume of the catalyst passed. The regeneration allows restoring the activity of a catalyst completely. The stability of the fresh and regenerated catalyst is the same.

The invention claimed is:

1. A catalyst for oxidative demercaptanization of hydrocarbon compositions, comprising 0.2–5% of an oxide selected from the group consisting of an oxide of a transition metal of group Ib, an oxide of a transition metal of group Vb, an oxide of a transition metal of group VIb, an oxide of a transition metal of group VIIb, a nickel oxide, a cobalt oxide, and a mixture of at least two of said oxides; 0.5–20% of a transition metal salt; 0.5–20% of a nitrogen-containing organic compound; and the rest-an inert component up to 100%, wherein said inert component is a substance selected from the group consisting of an oxide of an element of group IIa, an oxide of an element of Group III, an oxide of an element of group IV, an iron oxide, a chemical compound containing not less than 95% of at least one of said oxides, and a mixture of at least two of said substances, wherein said nitrogen-containing organic compound is a compound selected from the group consisting of amine, amide, amino acid, alkanol amine, urea derivative, and a combination of at least two of said compounds.

2. A catalyst as defined in claim 1, wherein said transition metal salt is a salt selected from the group consisting of chloride and bromide.

3. A catalyst as defined in claim 1, wherein said inert component is a component selected from the group consisting of silica, alumina, and a mixture thereof.

4. A catalyst as defined in claim 1, wherein said inert component is a component selected from the group consisting of a silicate containing not less than 90% of an oxide selected from the group consisting of an oxide of group Iia, an oxide of group III, an oxide of group IV and an iron oxide, a mixture of the silicate with silica, and a mixture of the silicate with alumina.

* * * * *